United States Patent [19]

Akiyama et al.

[11] Patent Number: 5,680,453

[45] Date of Patent: Oct. 21, 1997

[54] SOFTWARE DELIVERY SYSTEM, CENTER DEVICE, RELAYING DEVICE AND USER TERMINAL DEVICE

[75] Inventors: Ryota Akiyama; Makoto Yoshioka, both of Kawasaki, Japan

[73] Assignee: Fujitsu Limited, Kawasaki, Japan

[21] Appl. No.: 510,868

[22] Filed: Aug. 3, 1995

[30] Foreign Application Priority Data

Aug. 10, 1994 [JP] Japan ................... 6-219369

[51] Int. Cl.⁶ .................................................. H04L 9/00
[52] U.S. Cl. ........................................ 380/4; 380/25
[58] Field of Search ............................... 380/4, 25

[56] References Cited

U.S. PATENT DOCUMENTS

| | | |
|---|---|---|
| 4,247,106 | 1/1981 | Jeffers et al. . |
| 4,439,670 | 3/1984 | Basset et al. . |
| 4,446,519 | 5/1984 | Thomas . |
| 4,484,217 | 11/1984 | Block et al. . |
| 4,558,176 | 12/1985 | Arnold et al. . |
| 4,590,557 | 5/1986 | Lillie . |
| 4,646,234 | 2/1987 | Tolman et al. . |
| 4,649,510 | 3/1987 | Schmidt . |
| 4,654,799 | 3/1987 | Ogaki et al. . |
| 4,658,093 | 4/1987 | Hellman . |
| 4,672,554 | 6/1987 | Ogaki . |
| 4,674,055 | 6/1987 | Ogaki et al. . |
| 4,740,890 | 4/1988 | William . |
| 4,780,905 | 10/1988 | Cruts et al. . |
| 4,787,050 | 11/1988 | Suzuki . |
| 4,816,653 | 3/1989 | Anderl et al. . |
| 4,816,654 | 3/1989 | Anderl et al. . |
| 4,817,140 | 3/1989 | Chandra et al. . |
| 4,864,516 | 9/1989 | Gaither et al. . |
| 4,879,645 | 11/1989 | Tamada et al. . |
| 4,949,257 | 8/1990 | Orbach . |
| 4,999,806 | 3/1991 | Chernow et al. . |
| 5,006,849 | 4/1991 | Baarman et al. . |
| 5,008,814 | 4/1991 | Mathur . |
| 5,014,234 | 5/1991 | Edwards, Jr. . |
| 5,016,009 | 5/1991 | Whiting et al. . |
| 5,051,822 | 9/1991 | Rhoades . |
| 5,056,009 | 10/1991 | Mizuta . |
| 5,103,392 | 4/1992 | Mori . |
| 5,103,476 | 4/1992 | Waite et al. . |
| 5,166,886 | 11/1992 | Molnar et al. . |
| 5,181,107 | 1/1993 | Rhoades . |
| 5,199,066 | 3/1993 | Logan . |
| 5,214,697 | 5/1993 | Saito . |
| 5,222,134 | 6/1993 | Waite et al. . |
| 5,245,330 | 9/1993 | Wassink . |
| 5,267,171 | 11/1993 | Suzuki et al. . |

FOREIGN PATENT DOCUMENTS

| | | |
|---|---|---|
| 59-87486 | 5/1984 | Japan . |
| 5-197732 | of 1993 | Japan . |
| 5-298085 | 11/1993 | Japan . |
| 6-95871 | 4/1994 | Japan . |

OTHER PUBLICATIONS

Japanese Patent Laid–Open Publication No. 57–127249, Aug. 7, 1982 (equivalent to Japanese Patent Publication No. 61–22815).

Japanese Patent Laid–Open Publication No. 5–89363, Apr. 9, 1993.

Japanese Patent Laid–Open Publication No. 5–266575, Oct. 15, 1993.

Japanese Patent Laid–Open Publication No. 5–298085, Nov. 12, 1993.

Japanese Patent Laid–Open Publication No. 6–95871, Apr. 8, 1994.

*Primary Examiner*—David C. Cain
*Attorney, Agent, or Firm*—Staas & Halsey

[57] ABSTRACT

In order to realize an optimal software distributing form involving a software storing medium distributor and a communication company which provides software by utilizing communication lines, a center device for providing specified software to a user by ciphering it, a relaying device and a user terminal device are provided, and the center and the relaying device are made to carry out ciphering in a mode optimal to the software supply mode.

7 Claims, 9 Drawing Sheets

FIG. 8

| ROUTE<br>C SYSTEM | C1→C2 | P1→C2 | C4 | C3→P2 | P4 and<br>P3→P2 |
|---|---|---|---|---|---|
| ONE WAY | OFB→OFB | CBC→OFB | OFB | OFB→OFB | CBC→CBC |
| TWO WAY | CBC→CBC | CBC→CBC | CBC | CBC→CBC | CBC→CBC |

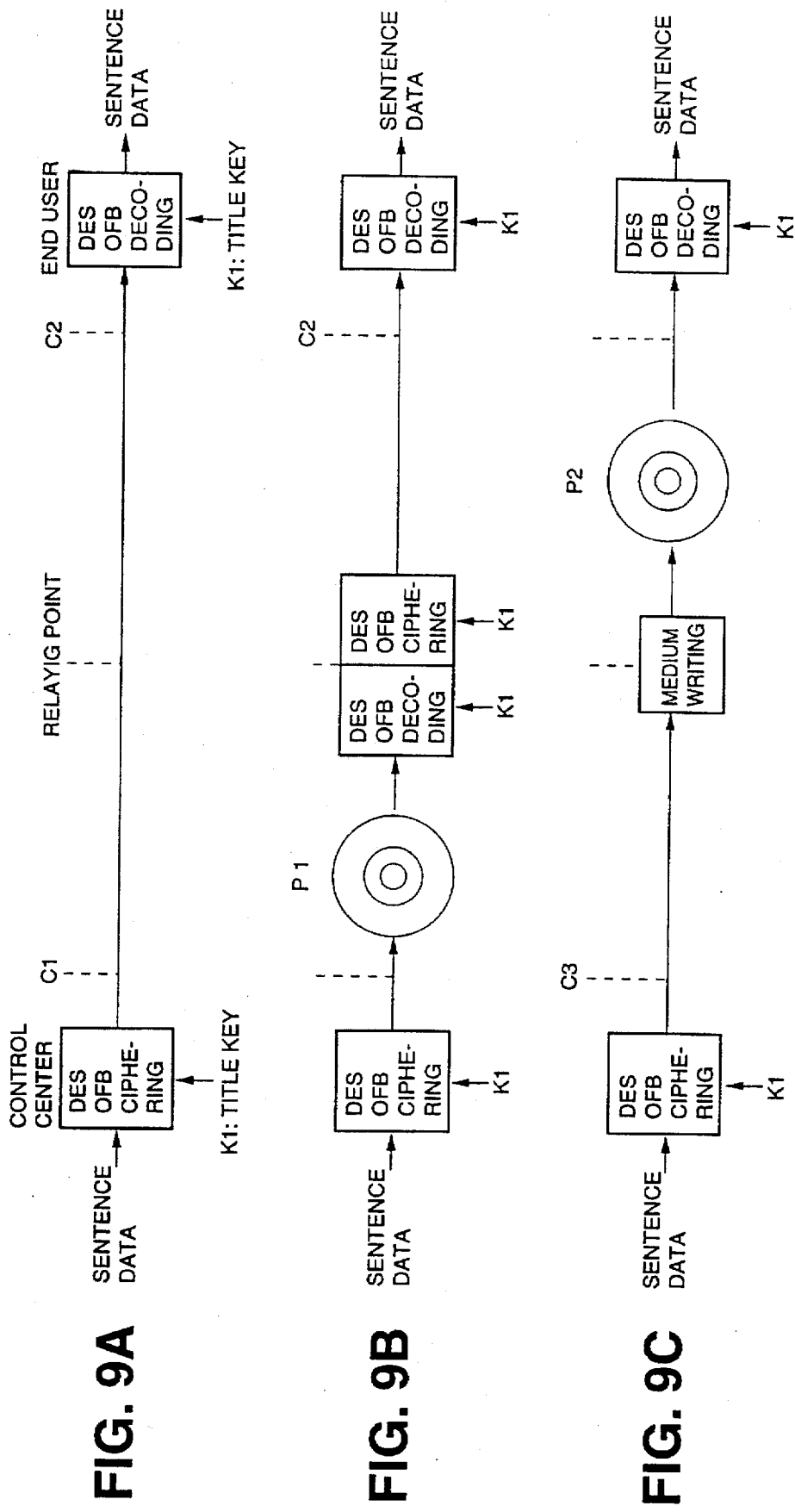

SOFTWARE DELIVERY SYSTEM, CENTER DEVICE, RELAYING DEVICE AND USER TERMINAL DEVICE

BACKGROUND OF THE INVENTION

The present invention relates to a technology effective for and applicable to a distribution system for software such as computer programs, video works or the like, particularly for digitalized software information.

With the developments of large-scale storage media such as CD-ROM, MO or the like, large-capacity and high-speed communication technologies such as B-ISDN or the like and cable television technologies, etc., it is expected that images and sounds, to say nothing of computer programs will be distributed as digital information by using these means.

That is, video works and others which have hitherto been supplied in the form of video tapes have now come to be sold as they are in such storing media as CD-ROM, MO or the like, or distributed on the market as games utilizing the interactive characteristic (two-way characteristic) of CD-ROM, MO or the like.

The same is true for communication lines, and the present situation is such that video works as mentioned above can now be sent to the users via communication lines.

As it is very easy to copy this kind of digital information on other media and there is no possibility of quality deterioration at the time of copying as in the case of analog information, copying of the same information is possible so that there is every possibility that the profits of the makers will be impaired due to such copying operation. In other words, as long as large-capacity and rewritable optical magnetic disks and magnetic disk devices are provided, the content of CD-ROM, MO or the like can be easily copied with only minimum knowledge of DOS commands.

Thus, in almost all cases, the renting of these kinds of digital information media is prohibited by the manufacturers because sufficient security checking is impossible.

On the other hand, as this kind of software is still very expensive, the end users more often than not hesitate to buy it until they are sure that the software is really what they want or it is usable for the hardware they have.

In this connection, a new software distributing system has begun to be realized, wherein a number of function-limited pieces of software stored in CD-ROM, MO or the like are sold at low prices, the end users send fees for the kind of software they want, and then codes for releasing the functional limitation for the software are reported to them.

Further, in the field of broadcasting, a system has been realized, wherein the broadcasting station provides video works to the users via communication satellites. According to this system, as video works are provided only to those users who have made contracts with the broadcasting station, information provided to the users from the communication satellites is ciphered and decipherers are provided to the contracted users. Also, keys for deciphering the ciphered information sent via the communication satellites are sent to them, and the decipherers decipher the information based on the keys. In this way, the contracted users are allowed to watch the deciphered video information on home TV. As for a charging system, however, irrespective of the period of watching time on the part of the users, etc., a uniform paying system is adopted, and further due to one-way characteristic of a broadcasting medium the users can only watch the programs specified by the broadcasting station. Thus, in order to obtain information they want, the users must wait until the time determined by the broadcasting station.

SUMMARY OF THE INVENTION

The present invention is to provide a technology effective for realizing a software distributing form involving at least a center for providing images and sounds, a distributor of software storing media such as CD-ROM, MO or the like and a communication company for providing software by utilizing communication lines, thereby improving security and reducing the time burdens imposed on the users.

A software delivery system according to the present invention includes a center and a user terminal device.

The center is provided with a function for ciphering the software the user wants. The center includes ciphering key generating means, utilization mode identifying means and ciphering processing means.

The ciphering key generating means is provided with a function for generating ciphering keys used for software ciphering.

The utilization mode identifying means is provided with a function for determining a ciphering mode in accordance with the form of software provision.

The ciphering processing means is provided with a function for ciphering software based on ciphering key information and modes.

The user terminal device is provided with a function for deciphering software offered from the center and outputting it. It includes charging information processing means, deciphering key generating means, utilization mode identifying means and deciphering processing means.

The charging information processing means is provided with a charging table for registering the amount of money each user can use (charging information storing means) and a control part for identifying whether the balance value of the charging table is over a specified value or not at the time of software provision and giving permission to deciphering of the software if it is over the specified value.

The control part is provided with a function for charging for every title relating to software whose deciphering is permitted. Specifically, the title of software is detected, and whenever deciphering of the software having this title is permitted, subtraction will be made from the balance of the charging table.

The deciphering key generating means is provided with a function for generating deciphering keys used for software deciphering.

The utilization mode identifying means is provided with a function for identifying the mode of the software provided by the center.

The deciphering processing means is for deciphering software based on a deciphering key generated by the deciphering key generating means and a mode identified by the utilization mode identifying means only in the case where deciphering is permitted by the charging information processing means.

Further, the ciphering key generating means and the deciphering key generating means may be made to detect software ID specifying each software or information on software titles, etc., and to generate ciphering and deciphering keys based on these bits of information.

As for a method of providing software from the center to the user terminal device, there exist the one of providing software by storing it in such storing media as CD-ROM, MO or the like, the one of providing it via communication media of communication lines, etc. Accordingly, the center must be provided with functions for writing software into a storing medium and transmitting it. The utilization mode identifying means may be made to identify whether software is sent to the user using a storing medium or via a communication medium and to determine a ciphering mode based on this identification result.

Furthermore, the system according to the present invention may be provided with a relaying device between the center and the user terminal device. This relaying device is provided with a function for transferring software provided from the center using a storing medium or a communication medium further to a single or a plurality of user terminal devices. Specifically, it includes deciphering key generating means, input side utilization mode identifying means, deciphering processing means, ciphering key generating means, output side utilization mode identifying means and ciphering processing means.

The deciphering key generating means is provided with a function for generating a deciphering key used to decipher software supplied from the center.

The input side utilization mode identifying means is provided with a function for identifying the ciphering mode of software supplied from the center.

The deciphering processing means is for deciphering software based on a deciphering key generated by the deciphering key generating means and a mode identified by the input side utilization mode identifying means.

The ciphering key generating means is provided with a function for generating a ciphering key used to cipher deciphering software.

The output side utilization mode identifying means is for determining a ciphering mode based on the form of software provision.

The ciphering processing means is provided with a function for ciphering software based on a ciphering key and a mode.

The user terminal device according to the present invention will be described hereinbelow.

The user terminal device includes an input device, charging information processing means, deciphering key generating means, utilization mode identifying means and deciphering processing means.

The input device is for inputting software the user wants, and it may be a driving device for reading software from a storing medium or it may be a communication device for receiving software data sent via a communication medium, for example.

The charging information processing means is provided with a function for identifying whether or not to give permission to software deciphering by consulting a user's charging balance when the software is input. Specifically, it includes a charging table for registering the amount of money the user can use and a control part for identifying whether the balance is over a specified value or not (or not "0") by consulting this charging table and giving permission to deciphering of the software if it is found to be over the specified value (not "0").

The deciphering key generating means is provided with a function for generating deciphering key used to deciphering software. Specifically, deciphering keys are generated based on the software IDs or titles of pieces of software.

The utilization mode identifying means is provided with a function for identifying the mode of input software.

The deciphering processing means is provided with a function for deciphering software based on a deciphering key generated by the deciphering key generating means and a mode identified by the utilization mode identifying means only when the charging information processing means gives permission to deciphering of the software.

At the software delivery system according to the present invention, the center ciphers the software the user wanted by and provides it to the user. That is, the center generates ciphering keys based on the software IDs or the titles of pieces of software and determines ciphering modes based on the data structures of pieces of software. Also, based on ciphering keys and modes it ciphers software.

Software ciphered at the center is provided to the user terminal device through storing media or communication media.

The user terminal device, when software is provided from the center, will consult the user charging balance and give permission to deciphering of the software if the balance is over the specified value (not "0"). Then, it will carry out subtraction from the user charging balance for each title of permitted software. Next, the user terminal device will generate a deciphering key based on the software ID or the title of the software and identify the mode of this software. It will decipher the software based on the deciphering key and the mode and output it to such output devices as a display, a speaker or the like.

According to the present invention, irrespective of forms for providing software, be it communication media or other media, it will be possible to uniformly manage software distribution. Further, by making it possible to change providing forms setting a relaying device, a software distribution in an optimal form will be allowed.

BRIEF DESCRIPTION OF THE DRAWINGS

FIG. 8 is a table showing a mode conversion at each provision route.

FIGS. 9A, 9B and 9C are views showing concepts of mode conversion at a relaying device at the embodiment.

DETAILED DESCRIPTION OF THE INVENTION

DESCRIPTION OF THE PREFERRED EMBODIMENT

Figure 1:
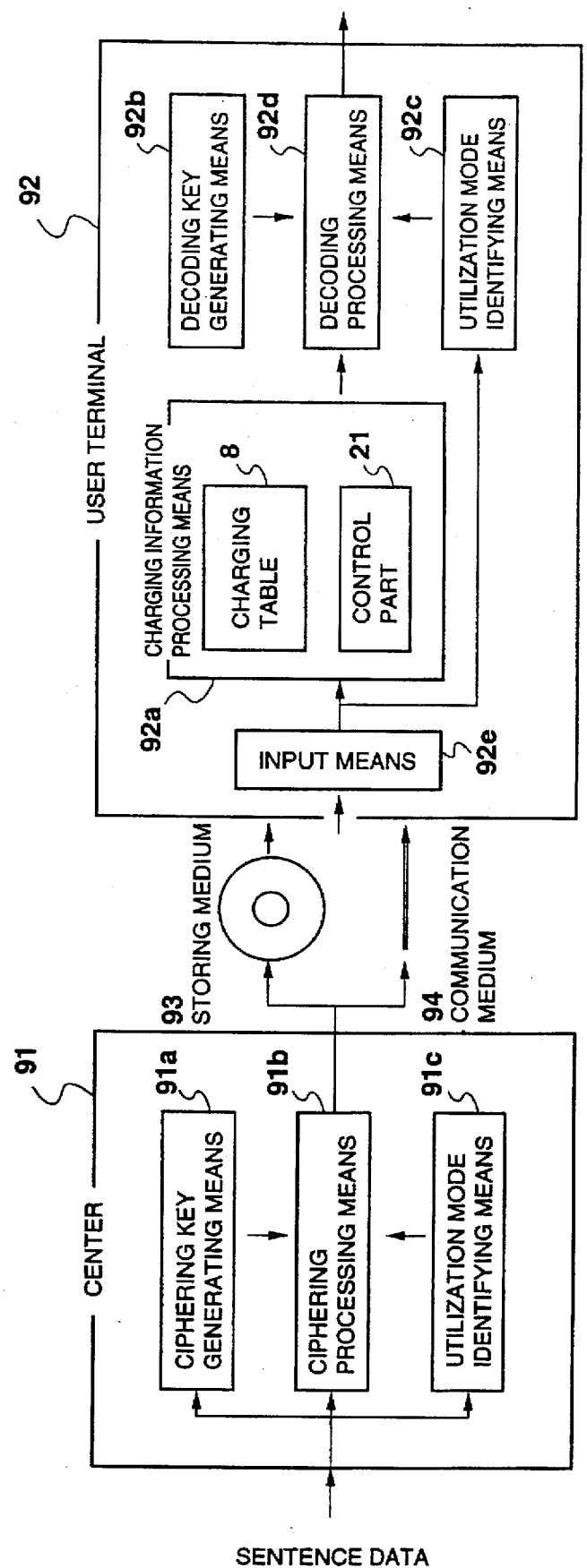
FIG. 1 is a view showing the principle(1) of the present invention.

Prior to description of the preferred embodiment, a basic construction according to the present invention will be described with reference to FIGS. 1 and 2.

First, a software delivery system according to the present invention is constructed by a center 91 and a user terminal device 92.

Then, the center 91 is provided with a function for ciphering the software the user wants. The center includes ciphering key generating means 91a, utilization mode identifying means 91c and ciphering processing means 91b.

The ciphering key generating means 91a is provided with a function for generating ciphering keys used to cipher software.

The utilization mode identifying means 91c is provided with a function for determining ciphering modes in accordance with the forms of software provisions.

The ciphering processing means 91b is provided with a function for ciphering software based on ciphering key information and modes.

The user terminal device 92 is provided with a function for deciphering software provided from the center 91. Specifically, it includes charging information processing means 92a, deciphering key generating means 92b, utilization mode identifying means 92c and deciphering processing means 92d.

The charging information processing means 92a includes a charging table 8 (charging information storing means) registering the amount of money the user can use and a control part 921 for identifying whether a balance value on the charging table 8 is over a specified value or not at the time of software provision and giving permission to deciphering of the software if it is over the specified value.

Further, the control part 921 is provided with a function for executing charging for each title of software given deciphering permission. Specifically, it detects the title of software and makes subtraction from a balance on the charging table 8 whenever deciphering of the title is given permission.

The deciphering key generating means 92d is provided with a function for generating deciphering keys used to decipher software.

The utilization mode identifying means 92c is provided with a function for identifying the mode of software provided from the center 91.

Further, the deciphering processing means 92d is for deciphering software based on deciphering keys generated by the deciphering key generating means 92b and modes identified by the utilization mode identifying means 92c only when the charging information processing means 92a.

Still further, the ciphering key generating means 91a and the deciphering key generating means 92b may be made to detect information on software ID specifying each individual software, titles or the like, and then generate ciphering keys and deciphering keys based on these bits of information.

As for a method of providing software from the center 91 to the user terminal device 92, there exist the one of providing it by storing software in a storing medium 93 of CD-ROM, MO, etc., the one through a communication medium 94 of communication lines, etc., and others. Accordingly, the center 91 must be provided with functions for writing software into the storing medium 93 and transmitting it. Then, the utilization mode identifying means 91c may be made to identify whether software will be provided to the user by means of the storing medium 93 or via the communication medium 94 and determine a ciphering mode based on this identification result.

Figure 2:
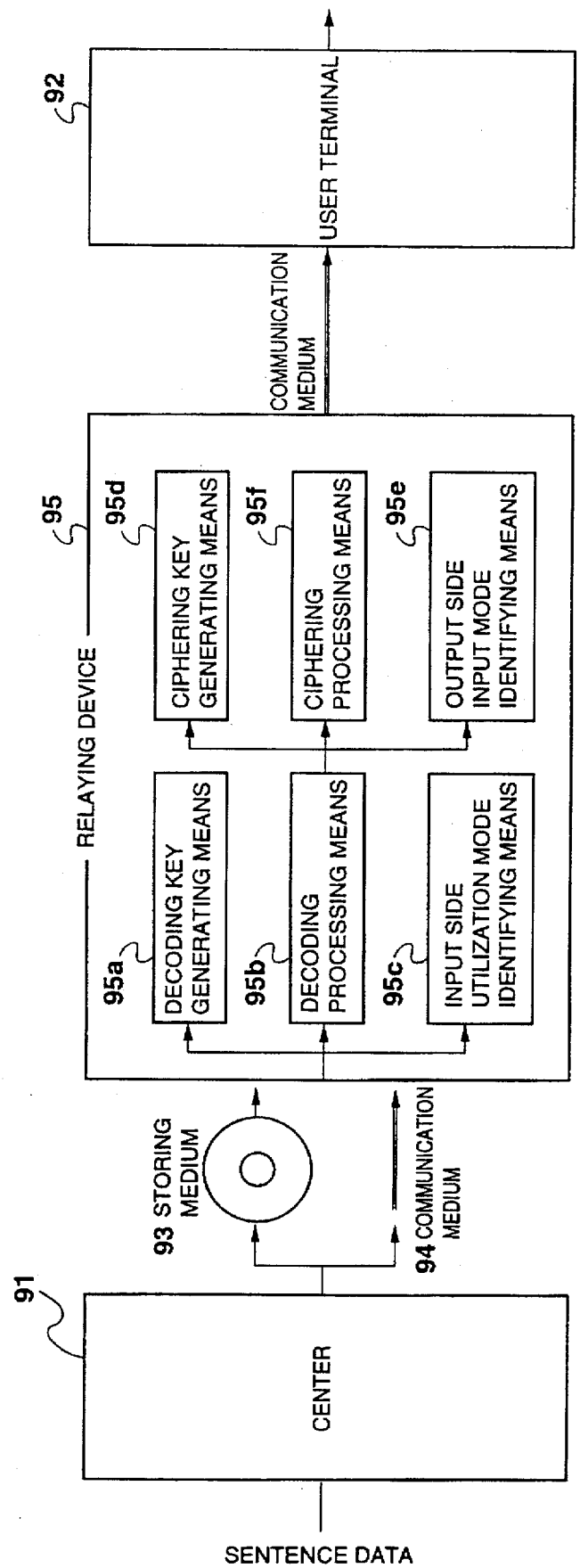
FIG. 2 is a view showing the principle(2) of the present invention.

Furthermore, the system according to the present invention may be provided with a relaying device 95 as shown in FIG. 2 between the center 91 and the user terminal device 92. This relaying device 95 is provided with a function for further transferring the software provided from the center 91 using the storing medium 93 or the communication medium 94 to a single or a plurality of user terminal devices 92. Specifically, the relaying device 95 includes deciphering key generating means 95a, input side utilization mode identifying means 95c, deciphering processing means 95b, ciphering key generating means 95d, output side utilization mode identifying means 95e and ciphering processing means 95f.

The deciphering key generating means 95c is provided with a function for generating deciphering keys used to decipher software supplied from the center 91.

The input side utilization mode identifying means 95c is provided with a function for identifying ciphering modes of software supplied from the center 91.

The deciphering processing means 95b is for deciphering software based on deciphering keys generated by the deciphering key generating means 95a and modes identified by the input side utilization mode identifying means 95c.

The ciphering key generating means 95d is provided with a function for generating ciphering keys based on ciphering decipher software.

The output side utilization mode identifying means 95e is for determining ciphering modes based on the forms of software provisions.

The ciphering means 95f is provided with a function for ciphering software based on ciphering keys and modes.

The user terminal device 92 according to the present invention will be described hereinbelow.

The user terminal device 92 according to the present invention includes an input device 92e, charging information processing means 92a, deciphering key generating means 92b, utilization mode identifying means 92c and deciphering processing means 92d.

The input device 92e is for inputting the software the user wants, and it may a driving device for reading software from the storing medium 93 or a communication device for receiving software data transmitted via the communication medium 94.

The charging information processing means 92a is provided with a function for identifying whether or not to give permission to software deciphering by consulting the user charging balance. Specifically, it includes a charging table 8 registering the amount of money the user can use and a control part 921 for identifying whether a balance is over a specified value (or not "0") consulting this charging table 8 and giving permission to software deciphering if it is over the specified value (not "0").

The deciphering key generating means 92b is provided with a function for generating deciphering keys used to decipher software. Specifically, it generates deciphering keys based on software IDs, titles of software, etc.

The utilization mode identifying means 92c is provided with a function for identifying modes of input software.

The deciphering processing means 92d is provided with a function for deciphering software based on deciphering keys generated by the deciphering key generating means 92b and modes identified by the utilization mode identifying means 92c only when the charging information processing means 92a gives permission to software deciphering.

At the software delivery system according to the present invention, the center 91 ciphers the software the user wants and provides it thereto. That is, the center 91 generates ciphering keys based on software IDs, titles, etc., of software and determines ciphering modes based on data structures, etc., of software. Then, based on ciphering keys and modes it ciphers software.

The software thus ciphered at the center is provided to the user terminal device through the storing medium 93 or the communication medium 94.

The user terminal device 92, when the software is provided from the center 91, will consult the charging balance of the user and give permission to deciphering of the software if it identifies that the balance is over the specified value (not "0"). Then, a subtraction will be made from the user's charging balance for each title of software given permission for deciphering. Then, the user terminal device 92 will generate deciphering keys based on software IDs or titles of software and identify modes for the software. The user terminal device 92 will decipher the software based on deciphering keys and modes and output it to such output devices as a display, a speaker or the like.

The preferred embodiment will be described more in detail hereinbelow.

According to the present embodiment, the center 91, the relaying device 95 and the user terminal device 92 can be realized by almost similar hardware constructions.

Figure 3:
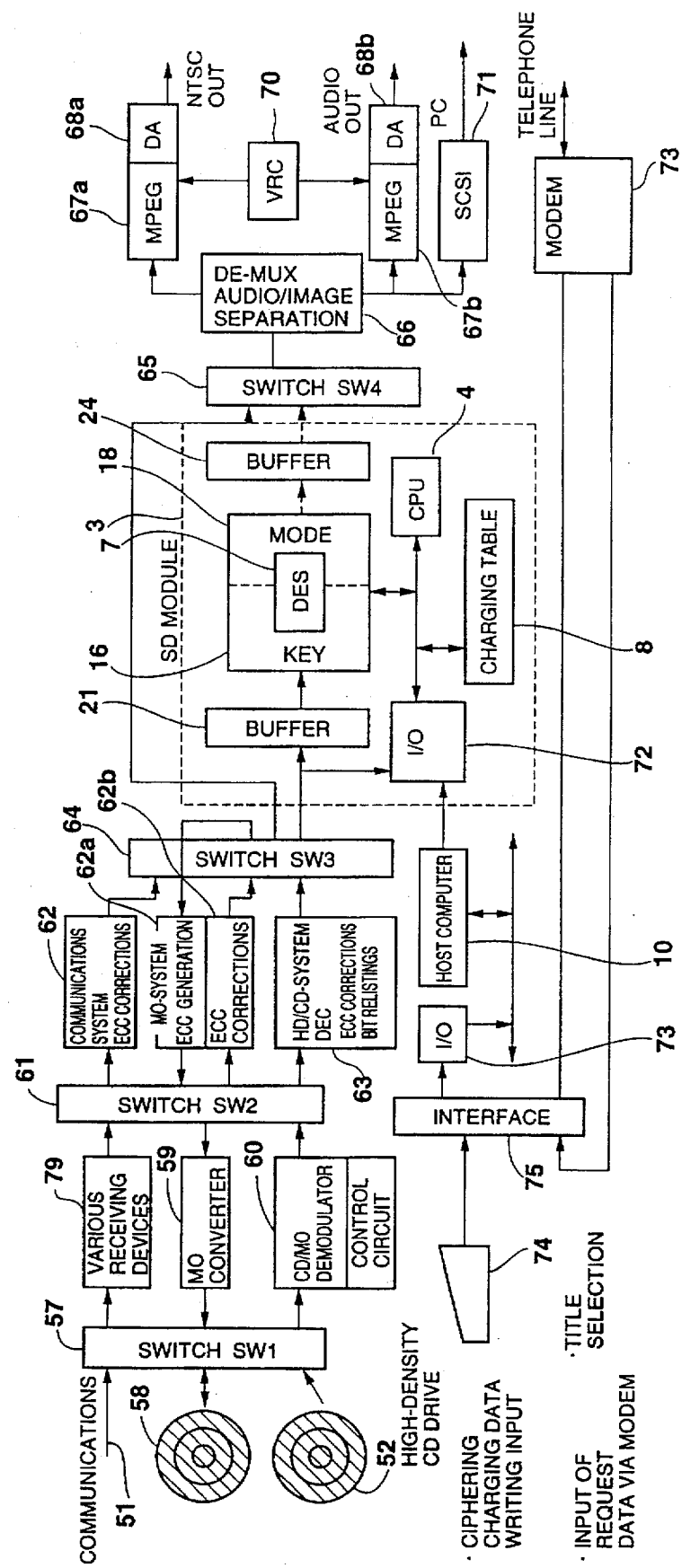
FIG. 3 is a block diagram showing the hardware construction of a center, a relaying device and a user terminal device at the embodiment according to the present invention.

FIG. 3 is a block diagram showing the internal functional construction of the user terminal device 92 as one such example.

In this Figure, a switch 57(SW1) functions as an input interface as well, and is used to input software information through such various providing routes as a communication line 51, a CD-ROM 52, MO, IC-card(PCMCIA type), DVD or the like. Also, by this switch 57 (SW1), reading and writing of software information into an optical magnetic disk 58 are allowed with an optical magnetic disk driving device (not shown in the Figure).

On a part next the switch 57(SW1), a receiver 79 as a signal processing means, an MO converter 59 and a CD/MO demodulator 60 are arranged. The receiver 79 is for transforming software information provided as a received signal via the communication line 51 into a data form processable by the device while the MO converter 59 is modulating means for writing into the optical magnetic disk 58. The CD/MO demodulator 60 is for demodulating data read from the CD-ROM 52 or the optical magnetic disk 58, which is controlled by the control circuit.

A switch 61 (SW2) is for selectively outputting data output from the respective signal processing means described previously to various error processing means. In the case of writing into the optical magnetic disk 58, transfer of data in a direction reverse to the error processing means the signal processing means is also controlled.

The error processing means is divided into a communication system error processing part 62, an optical magnetic disk error processing part 62 (62a, 62b) and a magnetic disk/CD system error processing part 63.

The optical magnetic disk system error processing part 62 includes an error check code generating part 62a and an error check code correcting part 62b, and the former will be made to function when writing into the optical magnetic disk 58 is carried out while the latter will be made to work when reading the optical magnetic disk is carried out. At the magnetic disk/CD system error processing part 63, error check code correction, bit rearraying, etc., are executed.

On a part following the error processing means, a switch 64(SW3) is arranged. This switch 64(SW3) is provided with a function for controlling routes so that software information processed at the signal processing means and the error processing means can be output to a software control part 3 on a stage next to it, or to a later mentioned switch 65(SW4), or an output from the error check code correcting part 62b can be returned to the error check code generating part 62a.
(WRITING FROM CD-ROM->OPTICAL MAGNETIC DISK)

A procedure for writing ciphered software information read from the CD-ROM 52 into the optical magnetic disk 58 by controlling the switch 64(SW3) will be described hereinbelow.

First, data read from the CD-ROM 52 is input to the CD/MO demodulator 60 with the route changed by the switch 57(SW1). The data demodulated here will be sent to the magnetic disk/CD system error processing part 63 with the route changed by the switch 61 (SW2). The data for which error check code correction and bit rearraying are carried here will be sent to the error check code generating part 62a with the route changed by the switch 64 (SW3), and an error check code corresponding to the optical magnetic disk will be added thereto. Then, this data will be sent to the MO modulator 59 with the route changed by the switch 61 (SW2), transformed into a data form to be written into the optical magnetic disk 58, and written thereinto by the switch 57 (SW1).
(CONSTRUCTION OF THE SOFTWARE CONTROL PART)

The software control part 3 is constructed in a module structure made of an IC card or a board, etc., including on its center DES as a deciphering part 7 having an input buffer 21 and an output buffer 24. For DES, "46 DATA ENCRYPTION STANDARD NIST" by FIP'S PUB, INC., may be used.

Key information is given from the outside to the DES, and based on this key information the DES is made to function and decipher ciphered information. According to the present embodiment, the DES is provided with a mode identifying part 18(MODE) having a function for selecting out of a plurality of DES modes the ones most suited to data forms, etc.

Further, in the case where the present device is used as the center 91 or the relaying device 95, this DES functions not only as a deciphering part 7 (deciphering processing means 95b) but also as a ciphering part (ciphering processing means 95f). Also, at this time, the mode identifying part 18 is made to function as the input side utilization mode identifying means 95c and the output side utilization mode identifying means 95e. The control CPU is made to function as the ciphering key generating means 95d and the deciphering key generating means 95a, as well.
(DESCRIPTION OF THE DES MODE)

Of the DES modes a representative logic will be described hereinbelow. Though the description will center on a deciphering processing, a ciphering processing adopted when the present device is used as the center 9 or the relaying device is similar to the one described hereinbelow.

Figure 4:
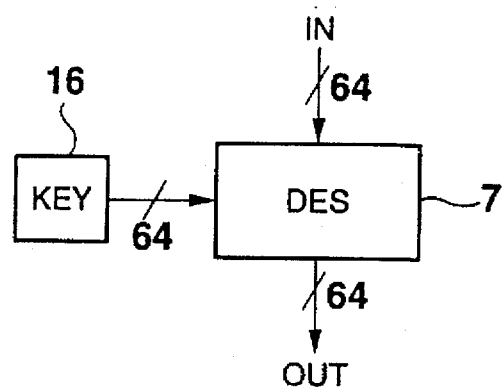
FIGS. 4A, 4B, 4C and 4D are views showing DES modes.
Figure 4:
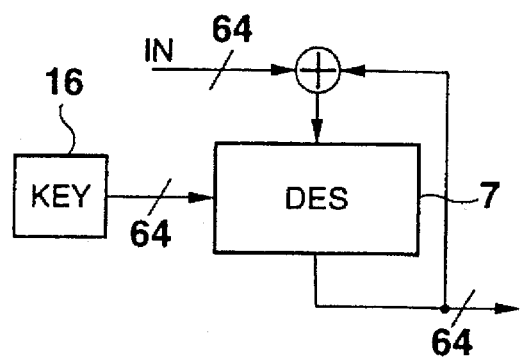
Figure 4:
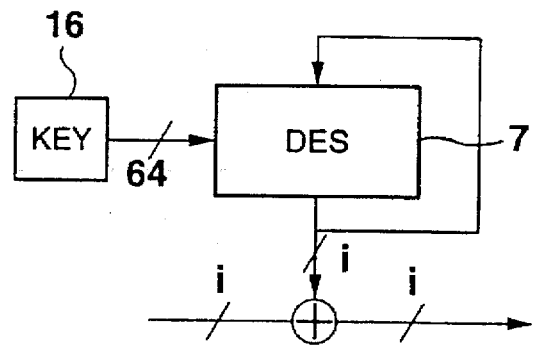
Figure 4:
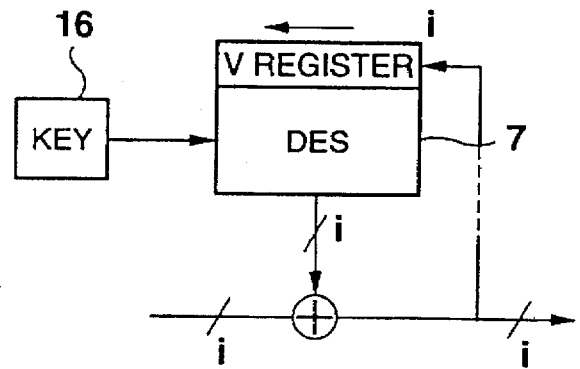

FIG. 4(a) shows a basic ECB mode, which is a mode for ciphering (or deciphering) an input data string of 64 bit as an output data string of 64 bit by key information 16 of 64 bit at the DES 7.

FIG. 4(b) shows a CBC mode, which is a mode for ciphering (or deciphering) an input data string of 64 bit by a key information 16 of 64 bit at the DES 7, and then returning it again to the DES 7. This is a system by which feedbacking is carried out until inputting of all data is finished, and then a final result is output, and thus it is suited to data processings for files, etc.

FIG. 4(c) shows an OFB mode suited to communication data for which errors are easily generated, audio data whose one error gives big influence on others, etc.

FIG. 4(d) shows a CFB mode suited to self synchronous type of data.

The mode identifying part 18 reads the best ones of these modes stored in a mode table 20 by analyzing data forms, etc., and sends them to the deciphering part (DES). At the DES 7, based on these selected modes ciphering and deciphering processings are carried out.

(DETAILS OF THE DECIPHERING PART)

Figure 5:
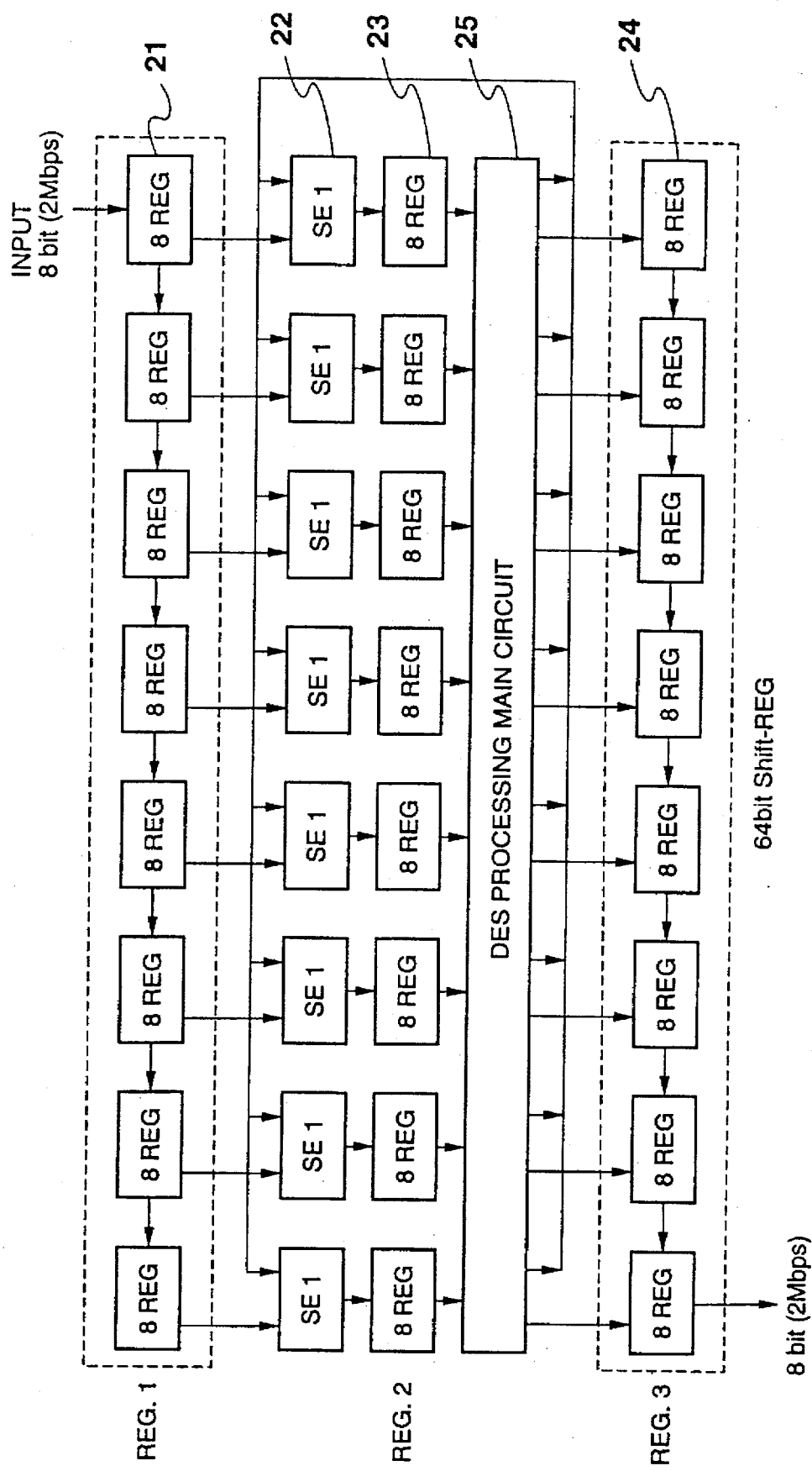
FIG. 5 is a view showing the detail of DES.

FIG. 5 is a block diagram showing the hardware construction of the deciphering part 7.

In this Figure, on the input side a shift register (REG 1) of 64 bit connecting 8 registers of 8 bit is disposed as an input buffer 21, and on a following part a selector sel is disposed. The selector sel allows selective inputting of either outputs from a later described DES processing main circuit 25 or those from the shift register (REG1).

On a part following the selector sel a register 23 (REG 2) of 8 bit is disposed, and on a part next to it the DES processing main circuit 25 is disposed. This DES processing main circuit 25 functions as a central DES of the deciphering part 7. That is, in the DES processing main circuit 25 various DES modes are registered as ROM (Read Only Memory) as described referring to FIG. 4, and in accordance with instructions from the control CPU 4 a deciphering processing is carried out by selecting the logic of the optimal DES mode.

The output of the DES processing main circuit 25 is branched to the selector sel and an output register (REG 3) as the output buffer 24. Then, the output of the output register(REG 3) is used as ciphered or deciphered data.

Figure 6:
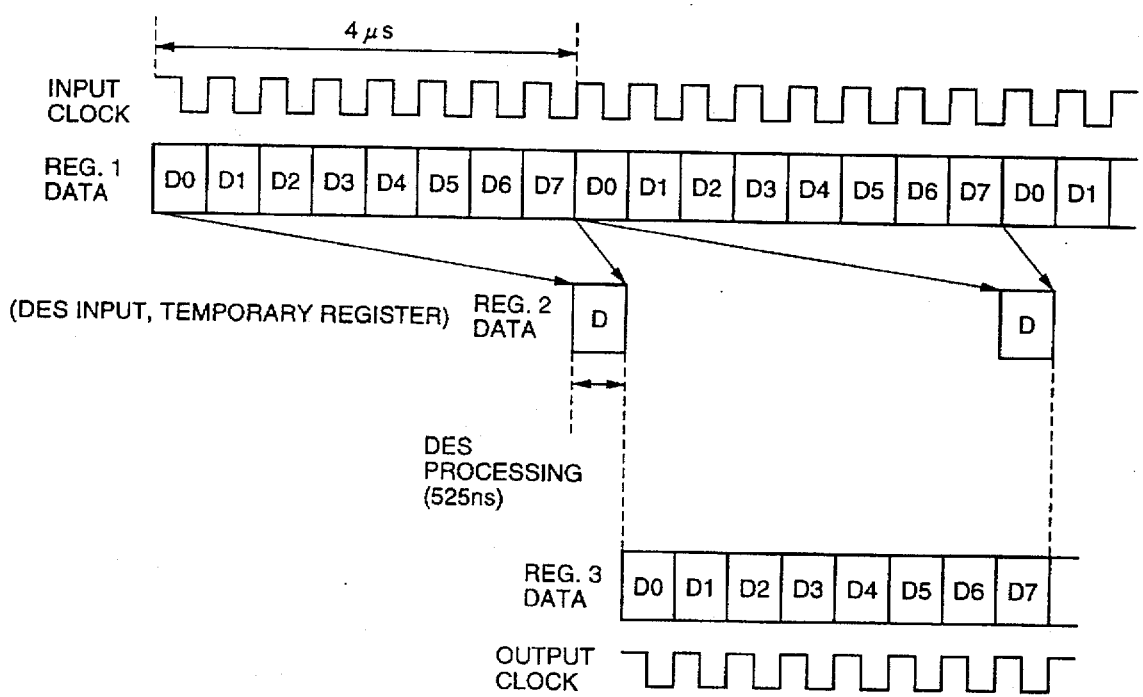
FIG. 6 is a flow chart showing input and output timings of DES.

This processing sequence is shown in FIG. 6.

In FIG. 6, the output of the input register (input buffer 21) is given DES processing as an output from the register 23 by the first clock of the next cycle. Then, it will be output from the output register (output buffer 24) by the next clock. At the time of outputting from this output register (output buffer 24), on the input side ciphered data of the next cycle is being fetched from the input register (input buffer 21).

In this way, at the present embodiment, by independently providing the input register (REG 1) as the input buffer 21 and the output register (REG 3) as the output buffer 24 it is possible to continuously carry out inputting of ciphered data and outputting of deciphered data independently. Thus, compared with the conventional DES wherein inputting and outputting are operated cyclically, faster decipher/ciphering processing are allowed.

The DES 7 described above is controlled by the control CPU 4, and to the bus of this control CPU 4 in addition to the DES 7 the charging table 8 constructed by a memory and an interface 72(I/O) are connected.

In the charging table 8 specified balance values are registered, and charging values are subtracted in accordance with the amount and time of deciphering ciphered software data.

When wishing to renew the balance values, by bringing a software management module provided as a card medium to a shop and paying fees the balance values of the charging table 8 will be increased.

In the case where the charging table 8 is not provided within an SD circuit 3, it is necessary to output the charging value information to a floppy disk, etc., and record it. In this case, if the charging value information is registered in such media as a floppy disk and so on in a state allowing the user to read, it is hard to maintain security. Thus, if the user information on the charging value, etc., is output to the outside, the control CPU 4 may be made to cipher such information at the DES 7, and then output it as ciphered data.

It means that the deciphering part(DES) is made to function as a ciphering part when the charging information is output to the outside.

Further, it is needless to say that this charging table 8 may be omitted when the present device is used only as the center 91 or the relaying device 95.

The interface 72(I/O) is connected to a host CPU 10 outside the software control part 3. Also, it is allowed to use the host CPU 10 on a host device side (i.e., software amount-base charging/reproducing device main body) as the control CPU 4.

On the host device side, an interface(IO) is connected to the bus of the host CPU 10, and through this and an outside interface 75 an input device 74 and a modem 73 are connected.

The output of the software control part 3 is output through a switch 65(SW4) to an audio image separating part 66(DE-MUX) which is an information transforming part, an image expanding part 67a, an audio expanding part 76b(MPEG), etc.

For the MPEG, "ISO/IEC CD 13818' 1 to 3" chips may be used.

Image data separated at the audio image separating part 66 (DE-MUX) is expanded at the image expanding part 67a (MPEG) and output to such analog displayers as a TV display or the like as an NTSC signal transformed at an D/A converter 68a.

Likewise, audio data is expanded at an audio expanding part 67b(MPEG) and output to such analog audio equipment as a speaker and so on as an NTSC transformed at a D/A converter 68b. Then, synchronization between images and audio is controlled by a synchronization control part 70(VRC). In addition, when the output of the audio image separating part 66 (DE-MUX) is output to the outside with no changes as digital data, it will be output to digital equipment such as personal computers or the like through an interface 71 (SCSI).

Further, when a viewer (tool for consulting contents) is not needed using the present device as the center 91 or the relaying device 95, parts including the audio image separating part 66 (DE-MUX) and thereafter may be omitted.

(ROUTE FOR PROVIDING SOFTWARE ACCORDING TO THE PRESENT INVENTION)

Figure 7:
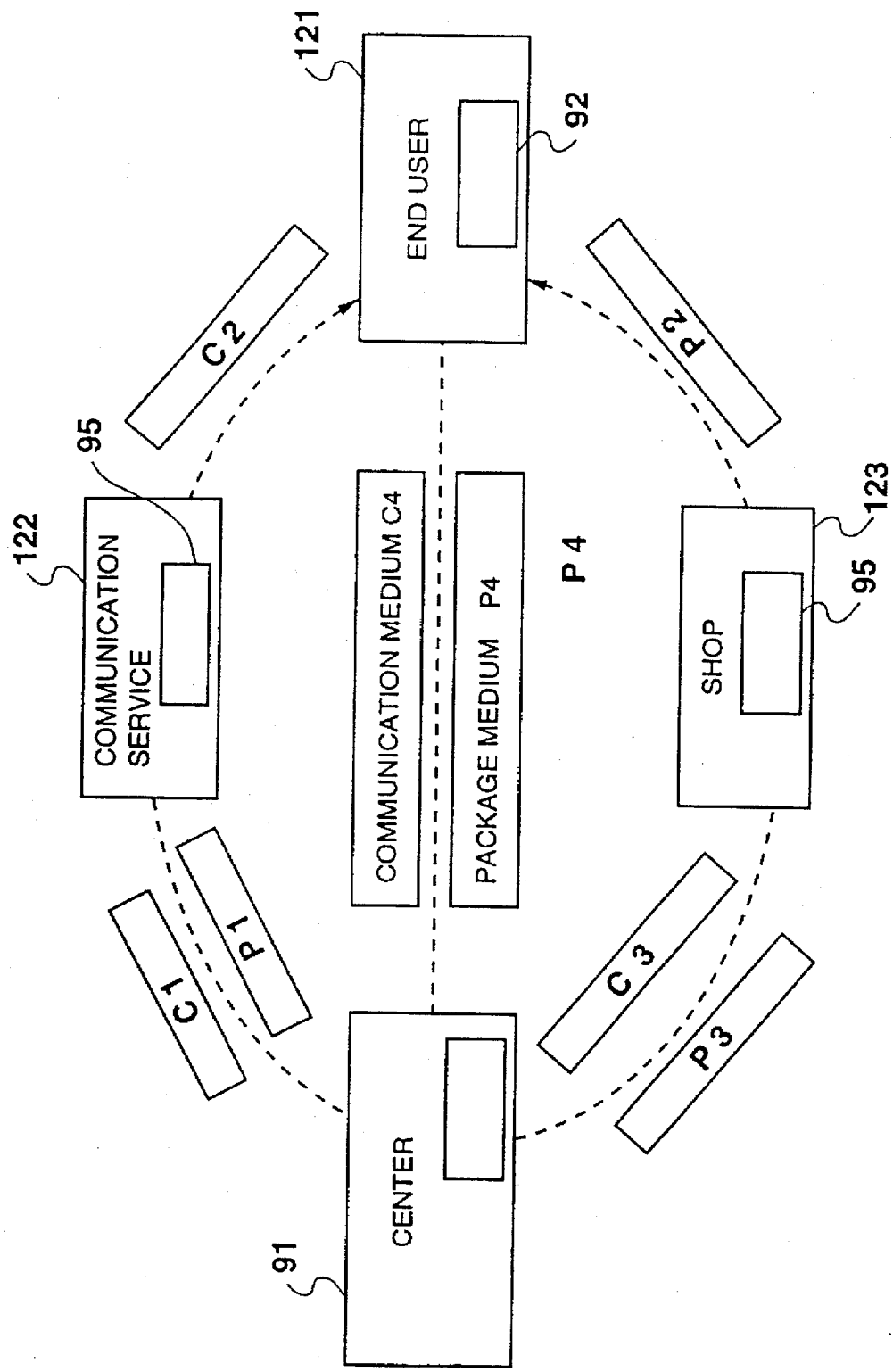
FIG. 7 is a view showing software provision routes according to the present invention.

Referring to FIGS. 7 to 9, modes for providing software according to the present invention will be described.

In FIG. 7, as forms of providing software from the center 91 to the end user 121, there are first a route via a communication company 122, second a route wherein software is purchased directly from the center 91 and third a route via a shop 123.

As for the first route via the communication company 122, from the center 91 to the communication company 122 there are cases where software is provided via a communication line C1 and by a medium form P1. As a communication line C1, various communication means are conceivable including public lines, optical communication lines, satellite communications, or the like. As a medium form P1, various medium means are conceivable including CD-ROMs, optical magnetic disks, floppy disks, or the like.

On this route, from the communication company 122 to the end user 121, software is provided via a communication line C2.

On this route, when the center provides software to the communication company 122, if it is via the communication line C1, as a ciphering mode the OFB mode as shown in FIG. 4(c) is best suited. Thus, the center 91 generated ciphered data on the OFB mode by its own DES 7 and outputs it to the communication line C1.

Upon receiving the ciphered data via the communication line C1, the communication company 122 will output the ciphered data as it is to the communication line C2 using the relaying device 95 (FIG. 9(a)). A processing at the user terminal device 92 which has received the ciphered software data via the communication line C2 is as described previously.

The case where ciphered software data is transmitted from the center 91 to the communication company by the medium form will be described hereinbelow.

In the case of the medium form P1, the CBC mode as shown in FIG. 4(b) is best suited as a ciphering mode. Thus, the center 91 ciphers software data on the CBC mode at its own DES 7 and stores this data in a medium such as a CD-ROM or the like. Upon receiving the ciphered software data stored in the medium of a CD-ROM, MO, IC-card (PCMCIA type), DVD or the like the communication company 122 will convert the ciphering mode using its own DES 7 in order to supply the ciphered software data to the communication line C2 (see FIG. 9(b)). That is, since the OFB mode is best suited to distributing data to the communication line C2 as a ciphering mode as mentioned previously, after the received ciphered software data is deciphered on the CBC mode first, it is ciphered again on the OFB mode. Upon receiving the software data thus ciphered, the end user 121 will execute deciphering based on the OFB mode selected by the mode identifying part 18(MODE) at the DES 7 of his own user terminal device 92.

The form of distributing software via a shop 123 will be described hereinbelow.

In the case where a route from the center 91 to the shop 123 is connected by a communication line C3 and software is provided from the shop 123 to the end user 121 by a medium form P2, the center 91 sends software data ciphered on the OFB mode at its own DES 7 to a communication line C3.

When receiving this ciphered software data at its own relaying device 95, the shop 123 will store it in a medium (P2) such as an optical magnetic disk, or the like (FIG. 9(c)). Open receiving this data by the medium (P2), the user terminal device 92 of the end user 121 will execute deciphering of the ciphered software data on the OFB mode at its own DES 7.

A list of mode conversions at the relaying device 95 is shown in FIG. 8. That is, the description thus made was limited to the cases of one-way distribution of software. In the case of two-way distribution, however, it is predetermined that the CBC mode must be always used.

What is claimed is:

1. A software deliver system comprising:

a center for ciphering specified software in accordance with an attribute of the software and providing the ciphered specified software to a user using a specified form of delivery, said center is provided with:
ciphering key generating means for generating a ciphering key used to cipher the specified software in accordance with the attribute of the specified software;
first utilization mode identifying means for determining a ciphering mode based on the specified form of delivering the ciphered specified software; and
ciphering processing means for ciphering the ciphered specified software in accordance with the ciphering key and the ciphering mode identified by said first utilization mode identifying means; and a user terminal device provided with:
deciphering key generating means for generating a deciphering key used to decipher the ciphered specified software based on the attribute of the specified software;

second utilization mode identifying means for identifying the ciphering mode of the ciphered specified software; and
deciphering processing means for deciphering the ciphered specified software based on the deciphering key and the ciphering mode identified by said second utilization mode identifying means.

2. The software delivery system according to claim 1, further comprising:
charging information storing means for registering a balance value which the user can use; and
control means for identifying whether the balance value is over a specified purchase value by consulting said charging information storing means, and for giving permission to said deciphering processing means if the balance value is over the specified value and at the same time subtracting the purchase value from the balance of said charging information storing means.

3. The software delivery system according to claim 1, wherein when determining the ciphering mode of the specified software, the utilization mode identifying means of said center refers to the form of delivering the ciphered specified software, identifies whether the specified software will be provided by storing in a storing medium or via communication means and determines the mode on the basis of the result of this identification.

4. The software delivery system according to claim 1, further comprising
a relaying device set between said center and said user terminal device, wherein said relaying device includes:
deciphering key generating means for generating a deciphering key used to decipher software ciphered by said center;
input side utilization mode identifying means for identifying the mode of software supplied from said center;
deciphering processing device for deciphering said software based on said deciphering key and said mode;
ciphering key generating means for generating a ciphering key used to cipher said deciphered data;
output side utilization mode identifying means for determining a ciphering mode based on said form of providing software;
and ciphering processing means for ciphering said software based on said ciphering key and said mode.

5. The software delivery system according to claim 4, wherein the relaying device further comprises:
utilization mode identifying means for identifying the ciphering mode of software provided from said center;
deciphering processing means for deciphering the software information based on said mode;
and ciphering processing means for deciphering said software information on a special mode based on the form of providing software information to said user terminal device.

6. A user terminal device for reproducing ciphered or nonciphered software information provided via a communication link or a medium and billing in accordance with the utilization of the software, comprising:
input switching means for changing input routes depending on a kind of a communication or medium;
software managing means for managing billing based on a deciphering of ciphered software information and a utilization of the software information;

an information converting part for converting deciphered information output from said software managing means into visible and audible data; and output route switching means for outputting ciphered software information, provided prior to said software managing means, to said software managing means and outputting nonciphered software information to said information converting part.

7. A system for ciphering software and providing it to a user terminal device for which a user pays fees depending on a form of software utilization, the system comprising:

a center device including:

ciphering key generating means for generating a ciphering key used to cipher software which the user wants in accordance with an attribute of the software;

utilization mode identifying means for determining a ciphering mode based on the form of providing said software; and a ciphering processing part for ciphering said software in accordance with the ciphering key generated said ciphering key generating means and the mode identified by said utilization mode identifying means.

* * * * *